(12) United States Patent
Tseng

(10) Patent No.: US 6,614,561 B1
(45) Date of Patent: Sep. 2, 2003

(54) INSTALLATION FOR INCREASING A SCANNING RANGE OF A SCANNER ALONG AN AXIAL DIRECTION OF A LIGHT SOURCE

(75) Inventor: Jen-Shou Tseng, Miao-Li Hsien (TW)

(73) Assignee: Umax Data Systems, Inc., Hsinchu (TW)

( * ) Notice: Subject to any disclaimer, the term of this patent is extended or adjusted under 35 U.S.C. 154(b) by 0 days.

(21) Appl. No.: 09/538,996

(22) Filed: Mar. 30, 2000

(30) Foreign Application Priority Data

Dec. 18, 1999 (TW) ...................................... 88222562 U

(51) Int. Cl.[7] .................................................. H04N 1/04
(52) U.S. Cl. ........................ 358/474; 358/487; 358/496
(58) Field of Search .................................. 358/474, 487, 358/496

(56) References Cited

U.S. PATENT DOCUMENTS 5,463,229 A * 10/1995 Takase et al. .................. 257/59
6,233,063 B1 * 5/2001 Bernasconi et al. ........ 358/474

FOREIGN PATENT DOCUMENTS

| JP | 361026039 A | * 2/1986 | .................. 355/75 |
| TW | 352886 | 7/1986 | |

* cited by examiner

Primary Examiner—Edward Coles
Assistant Examiner—Houshang Safaipour
(74) Attorney, Agent, or Firm—J. C. Patents

(57) ABSTRACT

An installation for increasing the scanning range along the axial direction of the light source. The installation includes a light source and a transparent glass panel. The light source provides a light beam necessary for scanning a document. The transparent glass panel has a coating thereon for lowering light transparency near the mid-portion of the light axis relative to either end.

12 Claims, 3 Drawing Sheets

INSTALLATION FOR INCREASING A SCANNING RANGE OF A SCANNER ALONG AN AXIAL DIRECTION OF A LIGHT SOURCE

CROSS-REFERENCE TO RELATED APPLICATION

This application claims the priority benefit of Taiwan application serial no. 88222562, filed Dec. 18, 1999.

BACKGROUND OF THE INVENTION

1. Field of Invention

The present invention relates to an installation for increasing a scanning range of a scanner. More particularly, the present invention relates to an installation for increasing a scanning range of a scanner along an axial direction of a light source.

2. Description of Related Art

In general, a scanning system can be roughly classified as a reflective type or a light-penetrating type. In the reflective scanning system, a document is placed over a transparent glass panel. Light from a light source travels through the transparent glass panel and hits the document. The light is reflected back from the document to reach an optical sensor after passing through a set of optical elements. The optical sensor, for example, can be a charge couple device (CCD) where a scan image is formed. In the light-passing scanning system, the document is also placed on top of a transparent glass panel. However, light from a light source has to pass through the document, the transparent glass panel and a set of optical elements before arriving at the optical sensor.

Hence, both the reflective and the transparent type of scanning system operate on similar principles. In the reflective scanning system, brightness variation of the reflected light from a document is gauged to form an image. On the other hand, in the transparency scanning system, brightness variation of light after passing through the document is gauged to form an image.

However, the brightness level along a conventional longitudinal lamp tube, in other words, along the light axis of a light source, is brightest in the middle and dimmer on either side. Hence, the image produced by the light source will also be brighter in the middle than either side. Since a scanner works according to variation in brightness level, capacity for detecting brightness contrast near the two end sections of the light axis is lower. If the variation in brightness level along the axial direction of the light source is large, quality of a scan image near the edges of the light axis may deteriorate. Therefore, variation of brightness level along the light axis of a light source is an important parameter in document scanning.

In brief, the lesser the variation of brightness level along the light axis, the better will be the scanning range of the light source and the effective contrast of the document.

SUMMARY OF THE INVENTION

Accordingly, one object of the present invention is to provide an installation for increasing the scanning range along the axial direction of a light source. The installation is capable of increasing the usable range of a light source (or lamp tubes) and reducing spatial occupation of the scanner. In addition, the installation is able to resolve the problem of insufficient contrast near the side edges compared with the central area of a document.

In Taiwan Patent No. 352886 titled 'A lens structure and its integration with an image-reading device', brightness variation along the axial direction of a light source is reduced by modifying a component. In the proposed device, a plurality of reflecting mirrors having coatings of varying thickness across the mirror surface is used inside the scanner. For example, the coating on the reflecting mirrors used for reflecting light is thickened in the middle or the coating thickness is reduced on each side of the reflecting mirrors so that brightness level through these mirrors are modified.

In this invention, rather than changing the reflectivity of the reflecting mirrors as in Taiwan Patent No. 352886, the transparent glass panel between the light source and a document or the transparency of glass panel that supports the document is modified.

To achieve these and other advantages and in accordance with the purpose of the invention, as embodied and broadly described herein, the invention provides an installation for increasing the scanning range along the axial direction of a light source. The installation includes a light source and a transparent glass panel. The light source provides a necessary beam of light for image scanning by the scanner. The transparent glass panel holds a scan document. Light from the light source penetrates the transparent glass panel and then passes through the document to produce a scan image. Alternatively, the light that penetrates the transparent glass panel is reflected back by the document to produce a scan image.

The transparent glass panel has a coating such that light transparency near the middle portion of the light axis is lower than near either end of the light axis.

This invention also provides a second installation for increasing the scanning range along the axial direction of a light source that includes a light source and a transparent glass panel. The light source provides a necessary beam of light for scanning a document by the scanner. The transparent glass is positioned between the light source and the scan document. Light from the light source penetrates the transparent glass panel and then impinges on the document for generating a scan image.

The transparent glass panel has a coating such that light transparency near the middle portion of the light axis is lower than at either end of the light axis.

Through the variation of light transparency across the transparent glass panel, this invention is able to smooth out the variation of brightness level along the light axis of the light source. Hence, scanning range of the light source is increased. Furthermore, since the variation of brightness level between the mid-portion and the sides is reduced, the problem of insufficient contrast near the edge compared with the central portion of a document is resolved.

In brief, this invention homogenizes the brightness level along the light axis by changing the light transparency across the surface of the light-channeling panel.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
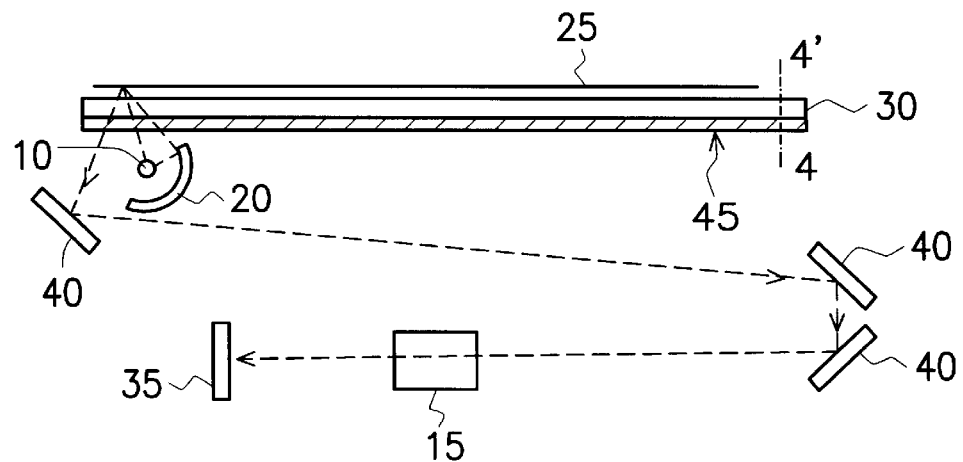
FIG. 1 is a schematic view of a scanning system according to a first preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view of a scanning system according to a first preferred embodiment of this invention. The scanning system includes a light source 10, a transparent glass panel 30, a light-source reflector 20, reflecting mirrors 40, a lens 15, a charge coupled device 35 and a document 25. The light source 10 provides the necessary light for document scanning. In general, the light source 10 is linear and hence has a light axis perpendicular to the plane of the page on which FIG. 1 lies. The document 25 is placed on top of the transparent glass panel 30. Light emerging from the light source is reflected from the light-source reflector 20. The reflected light penetrates the transparent glass panel 30 and then impinges upon the document 25. Light reflected from the document 25 passes through the transparent glass panel 30 again and arrives at the reflecting mirrors 40. After a plurality of reflections through the mirrors 40, the light passes through the lens 15 and finally impinges upon the charge coupled device 35 where a scan image is formed.

Light transparency varies across the transparent glass panel 30 due to the presence of a coating 45. Note that the coating 45 need not be deposited over the transparent glass panel 30 as shown in FIG. 1. The coating 45 can be deposited on a glass surface anywhere between the transparent glass panel 30 and the document 25.

Figure 4A:
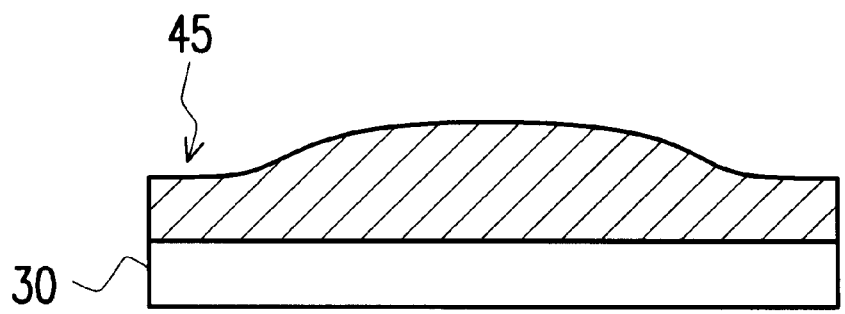
FIG. 4a is a cross-sectional view of the variation of coating thickness on the transparent glass panel according to a first embodiment of this invention.
Figure 4B:
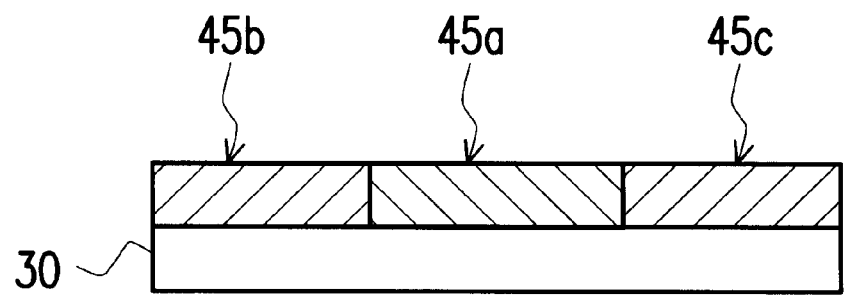
FIG. 4b is a cross-sectional view of the different coating materials on the transparent glass panel according to a second embodiment of this invention.

FIG. 4a is a cross-sectional view of the variation of coating thickness on the transparent glass panel according to a first embodiment of this invention. FIG. 4b is a cross-sectional view of the different coating materials on the transparent glass panel according to a second embodiment of this invention.

As shown in FIG. 4a, the coating 45 on the transparent glass panel 30 can be a layer of material having one light transparency but a variable thickness. On the other hand, the coating 45 on the transparent glass panel 30 can actually comprise a plurality of coatings 45a, 45b and 45c, with each coating material having a different light transparency. The coatings are laid side-by-side as shown in FIG. 4b and all have the same thickness. In FIG. 4b, the coating 45 is formed by depositing three different coating materials 45a, 45b and 45c in three different sections. However, the actual number of coating materials is variable depending on specification of the design.

Figure 3A:
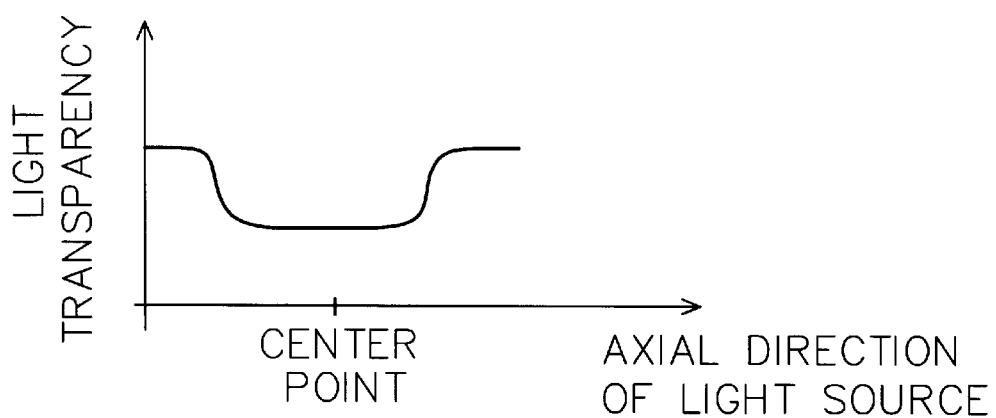
FIG. 3a is a graph showing the characteristic variation of light transparency of the transparent glass panel along the light axis of the light source.

In this embodiment, the light transparency of the transparent glass panel 30 varies along the light axis. FIG. 3a is a graph showing the characteristic variation of light transparency of the transparent glass panel along the light axis of the light source. As shown in FIG. 3a, light transparency is lower near the mid-portion of the light axis than the end-section of the light axis.

Figure 3B:
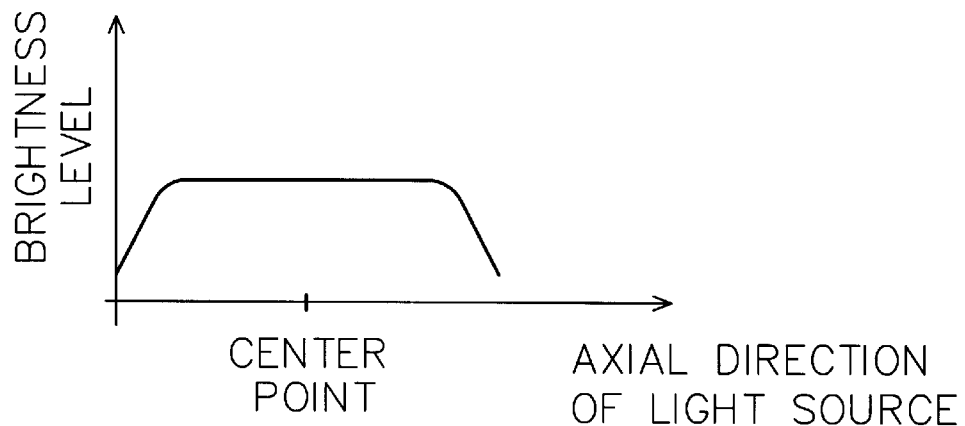
FIG. 3b is a graph showing the variation of brightness level of the light source along the light axis of the light source.

FIG. 3b is a graph showing the variation of brightness level of the light source along the light axis of the light source. As shown in FIG. 3b, brightness level produced by the light source 10 near the mid-portion of the light axis is higher than the brightness level near either end of the light axis.

Figure 3C:
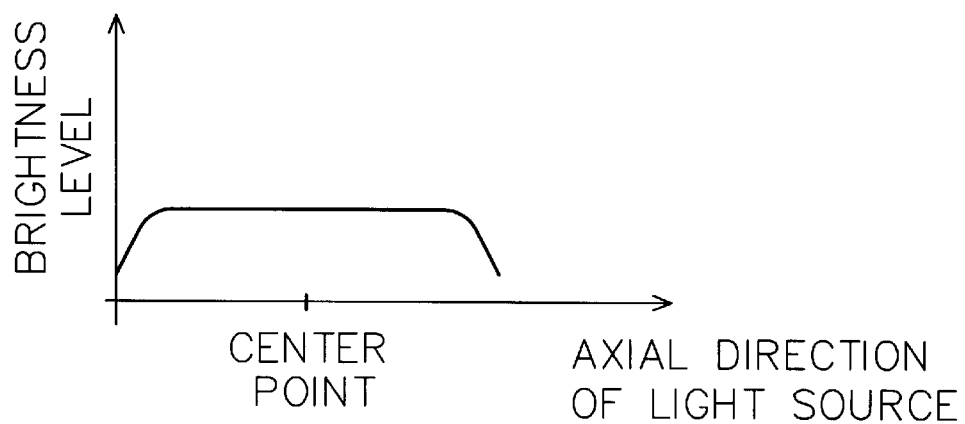
FIG. 3c is a graph showing the variation of brightness level of light along the light axis of the light source after a beam of light from the light source has passed through the transparency glass panel.

FIG. 3c is a graph showing the variation of brightness level of light along the light axis of the light source after a beam of light from the light source has passed through the transparency glass panel. As shown in FIGS. 3b and 3c, width of the uniform brightness region along the light axis shown in FIG. 3c is wider than the width of the uniform brightness region along the light axis shown in FIG. 3b. Hence, light emerging from the transparent glass panel 30 has a wider scanning range. Furthermore, since brightness level in the mid-portion is very similar to the brightness level near the end sections, light contrast between the end sections and the mid-portion is almost identical.

Figure 2:
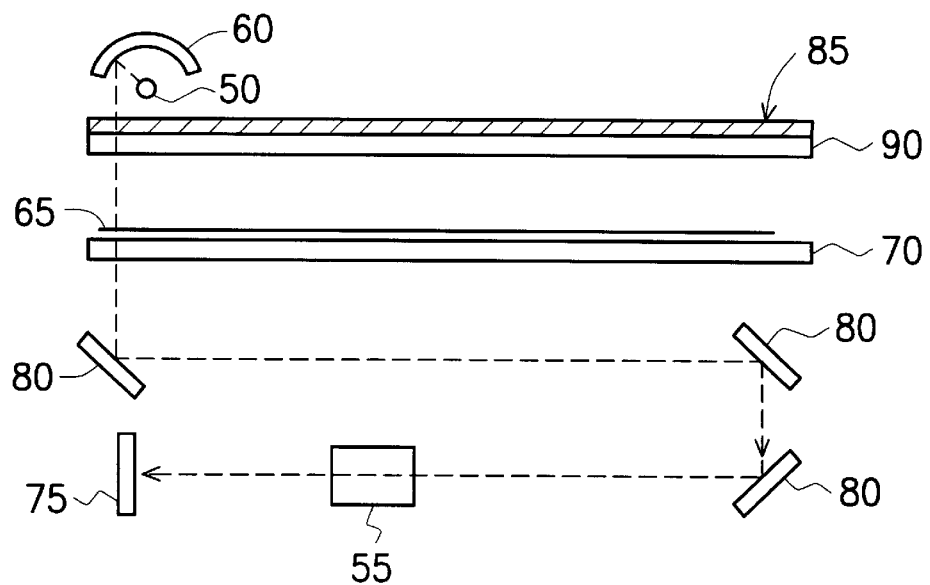
FIG. 2 is a schematic view of a scanning system according to a second preferred embodiment of this invention.

FIG. 2 is a schematic view of a scanning system according to a second preferred embodiment of this invention. The scanning system includes a light source 50, a first transparent glass panel 70, a second transparent glass panel 90 (transparent glass panel for light processing), a light-source reflector 60, reflecting mirrors 80, a lens 55, a charge coupled device 75 and a document 65. The light source 50 provides the necessary light for document scanning. The document 65 is placed on top of the first transparent glass panel 70. Light emerging from the light source 50 is reflected by the light-source reflector 60. The reflected light passes through the second transparent glass panel 90 and then impinges upon the document 65. Light passes through the document 65 and the first transparent glass panel 70 to arrive at the reflecting mirrors 80. After a plurality of reflections through the mirrors 80, the light passes through the lens 55 and finally impinges upon the charge couple device 75 where a scan image is formed.

In the second embodiment, light transparency varies across the second transparent glass panel 90 due to the presence of a coating 85. Note that the coating 85 need not be formed over the second transparent glass panel 90 as shown in FIG. 2. The coating 85 can be deposited on a glass surface anywhere between the second transparent glass panel 90 and the document 65.

A cross-section of the coating 85 and the second transparent glass panel 90 is similar to the cross-section of the coating 45 and the transparent glass panel 30 shown in FIGS. 4a and 4b. In other words, the coating 85 can be a layer of material having one light transparency but a variable thickness, or the coating 85 can actually comprise of a plurality of coating materials, each having a different light transparency.

In this embodiment, the light transparency of the second transparent glass panel 90 varies along the light axis. FIG. 3a is a graph showing the characteristic variation of light transparency of the transparent glass panel along the light axis of the light source. As shown in FIG. 3a, light transparency is lower near the mid-portion of the light axis than at either end of the light axis.

Besides forming a coating over the second transparent glass panel 90 to change light transparency, light transparency of the first transparent glass panel 70 can be also modified. Alternatively, both the first transparent glass panel 70 and the second transparent glass panel 90 can be modified simultaneously so that the ultimate brightness level across the scanning range is homogenized. The coating on the first transparent glass panel 70 and/or the second transparent glass panel 90 can be a layer of material having one light transparency but a variable thickness, or the coating can actually comprise of a plurality of coating materials, each having a different light transparency.

FIG. 3b is a graph showing the variation of brightness level of the light source along the light axis of the light source. As shown in FIG. 3b, brightness level produced by the light source 10 near the mid-portion of the light axis is higher than the brightness level near the two end sections of the light axis.

FIG. 3c is a graph showing the variation of brightness level of light along the light axis of the light source after a beam of light from the light source has passed through the transparency glass panel. As shown in FIGS. 3b and 3c, width of the uniform brightness region along the light axis shown in FIG. 3c is wider than the width of the uniform brightness region along the light axis shown in FIG. 3b. Hence, light emerging from the first transparent glass panel 90 has a wider scanning range. Furthermore, since brightness level in the mid-portion is very similar to the brightness level near the end sections of the light axis, light contrast between the end sections and the mid-portion is almost identical. When usable range on the light axis in increased, length of a lamp tube for scanning a document of a given dimension may be reduced. Thus, size of the scanner can be reduced.

Although a charge couple device (CCD) is used in both the first and the second embodiment of this invention, a contact image sensor (CIS) can also be used as a receiver for the image from the document.

In summary, the invention is able to smooth out the brightness level of light source so that a wider scanning width can be obtained for a given light source. Hence, size of a scanner can be reduced. In addition, the invention is able to resolve the problem of insufficient contrast along the edge regions compared with the central portion of a document.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An installation on a scanner for increasing a scanning range along an axial direction of a light source, comprising:
   a light source having a light axis, wherein the light source provides a light beam necessary for scanning a document; and
   a transparent glass panel for holding the document and permitting passage of light from the light source so that a scan image of the document can be ultimately obtained, wherein the transparent glass panel has a coating thereon for lowering light transparency near mid-portion of the light axis relative to either end of the light axis, wherein the coating is formed using a single layer of coating material but having a variable thickness across the transparent glass panel.

2. The installation of claim 1, wherein the scan image is formed by light provided by the light source on reflecting from the document.

3. The installation of claim 1, wherein the scan image is formed by light provided by the light source on passing through the document.

4. The installation of claim 3, wherein an additional second transparent glass panel is inserted between the document and the light source.

5. The installation of claim 4, wherein the second transparent glass panel has a coating thereon for lowering light transparency near the mid-portion of the light axis relative to either end of the light axis.

6. The installation of claim 5, wherein the coating is formed using a plurality of coating materials, each having a different light transparency.

7. The installation of claim 5, wherein the coating is formed using a single layer of coating material but having a variable thickness across the transparent glass panel.

8. An installation on a scanner capable of increasing a scanning range along an axial direction of a light source, comprising:
   a light source having a light axis, wherein the light source provides a light beam necessary for scanning a document;
   a transparent glass panel for holding the document and permitting passage of light from the light source so that a scan image of the document can be ultimately obtained, wherein the scan image is formed by light provided by the light source on passing through the document; and
   a second transparent sass panel is inserted between the document and the light source, wherein the second transparent glass panel has a coating thereon for lowering light transparency near the mid-portion of the light axis relative to either end of the light axis, wherein the coating is formed using a single layer of coating material but having a variable thickness across the second transparent glass panel, and light from the light source is able to penetrate the panel and the document to form a scan image of the document.

9. The installation of claim 8, wherein the coating is formed using a plurality of coating materials each, having a different light transparency.

10. An installation on a scanner for increasing a scanning range along an axial direction of a light source, comprising:
    a light source having a light axis, wherein the light source provides a light beam necessary for scanning a document;
    a transparent glass panel for holding the document and permitting passage of light from the light source so that a scan image of the document can be ultimately obtained, wherein the scan image is formed by light provided by the light source on passing through the document, wherein the transparent glass panel has a coating thereon for lowering light transparency near mid-portion of the light axis relative to either end of the light axis; and
    an additional second transparent glass panel is inserted between the document and the light source, wherein the second transparent glass panel has a coating thereon for lowering light transparency near the mid-portion of the light axis relative to either end of the light axis.

11. The installation of claim 10, wherein the coating is formed using a plurality of coating materials, each having a different light transparency.

12. The installation of claim 10, wherein the coating is formed using a single layer of coating material but having a variable thickness across the transparent glass panel.

* * * * *